United States Patent

[11] 3,622,700

[72] Inventor Frederick J. Goetz, Jr.
Arlington Heights, Ill.

[21] Appl. No. 73,090
[22] Filed Sept. 17, 1970
[45] Patented Nov. 23, 1971
[73] Assignee Motorola, Inc.
Franklin Park, Ill.

[54] TELEVISION RECEIVER WITH PROVISION FOR FACILITATING SERVICEABILITY
5 Claims, 3 Drawing Figs.

[52] U.S. Cl. .......... 178/7.9, 178/DIG. 4, 312/7 TV
[51] Int. Cl. .......... H01j 29/02
[50] Field of Search .......... 178/7.8, 7.9, DIG. 4; 325/353, 354, 355, 356; 312/7 R, 4 TV

[56] References Cited

UNITED STATES PATENTS 2,510,103 6/1950 Griffin .......... 325/353
2,898,585 8/1959 Bauman .......... 312/7 TV

*Primary Examiner*—Richard Murray
*Assistant Examiner*—Richard K. Eckert, Jr.
*Attorney*—Mueller & Aichele

ABSTRACT: In a television receiver of the type having an electronic chasis mounted on a movable drawer for movement from an operating position located within the television cabinet to a servicing position by pulling the chassis forward through an opening to the front of the cabinet, an opening in the back of the cabinet is provided adjacent the powerline cord interlock to permit a serviceman to reach through the opening to connect a powerline cord to the chassis with the chassis in the forward position after the powerline cord interlock has been opened by movement of the chassis to the servicing position.

PATENTED NOV 23 1971

3,622,700

INVENTOR
FREDERICK J. GOETZ Jr.
BY Mueller & Aichele
ATTORNEYS

TELEVISION RECEIVER WITH PROVISION FOR FACILITATING SERVICEABILITY

BACKGROUND OF THE INVENTION

A frequent complaint by the purchasers of consumer electronic equipment is the high cost of repairing such equipment in the event of failure. This is especially true of television receivers and color television receivers in particular. Due to the complexity of television receivers and the high labor cost of capable technicians for servicing such receivers, the cost of repairs in the event of a failure is becoming increasingly high.

As a consequence, it is desirable to provide a television receiver which includes features for facilitating the servicing of the receiver in the event that a failure of components therein should occur. In order to reduce the cost of repairs of a television receiver, it is desirable to reduce the time necessary to effect the repairs since the cost of most service calls is based on the amount of time required by the technician to effect the repair or servicing. A television receiver has been developed in which the electronic chassis is mounted for slidable movement through an opening in the front of the television receiver cabinet from an operating position, in which the chassis is located within the cabinet, to a servicing position with the chassis withdrawn from the cabinet in the nature of a drawer. This permits ready access to the electronic components mounted within the chassis from both sides, the top, and the bottom and permits the serviceman to make repairs in the chassis while observing the effect of the repairs on the picture tube screen from the front of the receiver.

Although this "drawer-type" chassis permits a reduction in the time required for the servicing or repair of a television receiver, television receivers all are required to include a power interlock for preventing the application of power through the line cord to the chassis of the receiver when the chassis is exposed for servicing. This is necessary for safety reasons, due to the high voltages which are present at various points in the television chassis employed in present television receivers, to prevent the possibility of harm to an inexperienced person attempting to repair the receiver.

When an experienced repairman, however, effects repairs on a television receiver, it often is desirable for power to be applied to the chassis in order to observe the effects of these repairs and to make necessary measurements or tests at various points in the circuits to isolate and correct the problem which necessitated the service call. Thus, a serviceman generally connects a powerline cord, commonly called a "cheater cord," to the chassis connector terminals which normally mate with the powerline connector mounted on the back cover of the cabinet to thereby supply power to the set when servicing is being made.

In the case of a television receiver with the slidably movable chassis noted above, the powerline cord interlock is broken by movement of the chassis from an operating position where it is fully within the cabinet, substantially abutting the back cover of the cabinet, to the servicing position where it is pulled away from the back cover, thereby disconnecting the power connector terminals on the chassis from the powerline cord mounted on the back of the cabinet. To connect a cheater cord to the chassis it has been necessary to provide a serviceman's interlock at the front of the chassis or to remove the back cover of the cabinet to enable the connection of the cheater cord to the back of the chassis. The former requires an added expense in the manufacture of the television receiver and the latter requires additional servicing time to remove and replace the back of the cabinet, even though such removal and replacement otherwise may not have been necessary due to the fact that most of the servicing of the chassis can be effected merely by withdrawing the chassis to its servicing position for service from the front of the television receiver.

SUMMARY OF THE INVENTION

Therefore, it is an object of this invention to improve the serviceability of electronic apparatus.

It is an additional object of this invention to improve the serviceability of a television receiver with a powerline cord interlock by providing ready access to the connector terminals on the chassis for applying power thereto when servicing or testing of the chassis is necessary.

In accordance with a preferred embodiment of this invention, electronic apparatus having a cabinet for enclosing a slidable chassis, which is movable through an opening in the front of the cabinet from an operating position to a servicing position, includes a powerline connector terminal mounted on the rear of the chassis and a powerline cord terminal attached to the back of the cabinet for matingly and conductively engaging the powerline connector terminal on the chassis with the chassis in the operating position abutting the cabinet back. The cabinet back has an opening located adjacent the powerline cord terminal on the Chassis, with the opening being blocked by the rear of the chassis when the chassis is in the operating position. Movement of the chassis to the servicing position disconnects the powerline cord terminal and the powerline connector terminal and unblocks the opening in the cabinet back to permit the attachment of a separate line cord through The opening to the powerline connector terminal on the rear of the chassis.

DETAILED DESCRIPTION

Figures 1, 2, 3:
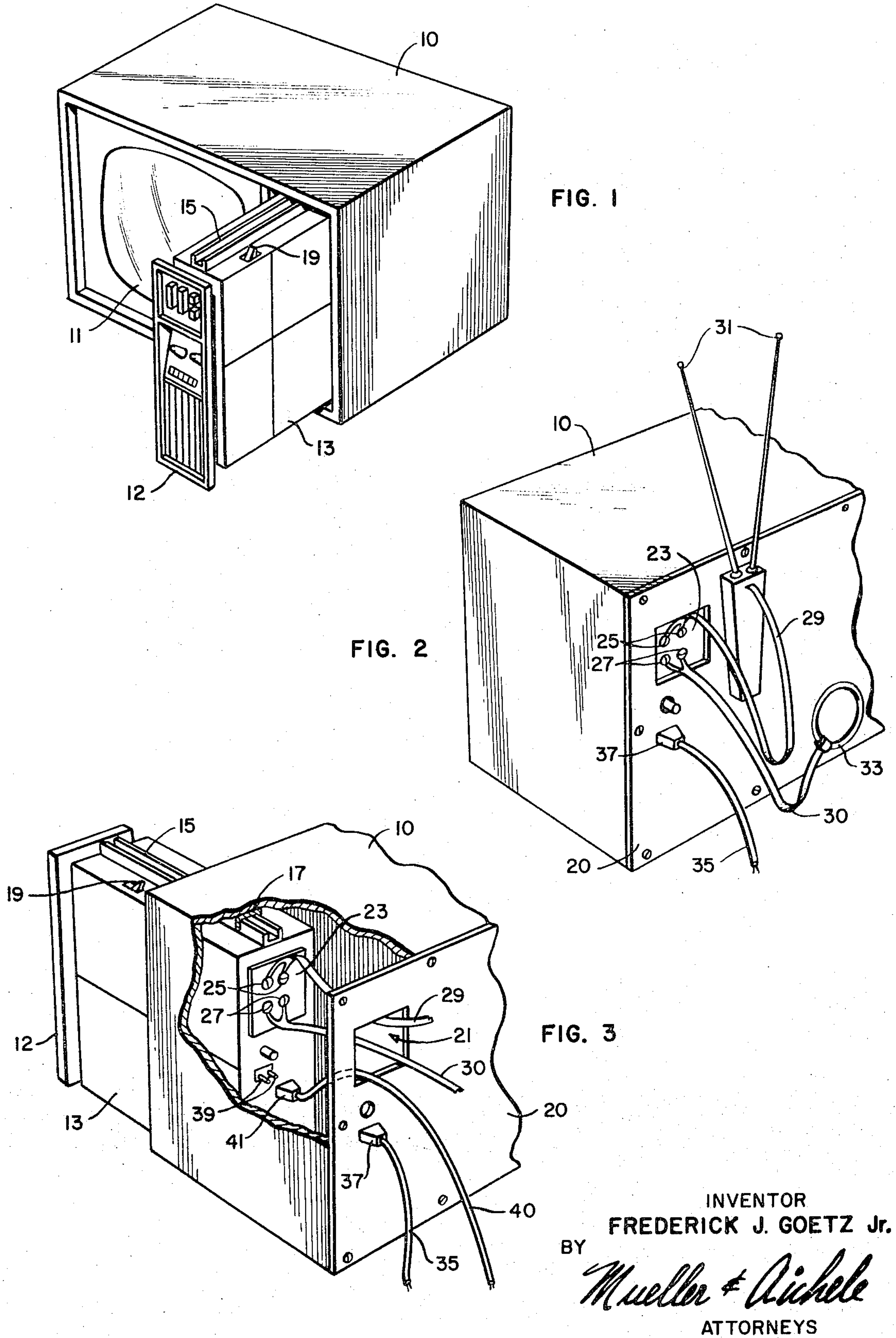
FIG. 1 is a front perspective view of a television receiver in which the invention may be used.
FIG. 2 shows a rear perspective view of a television receiver cabinet in accordance with a preferred embodiment of the invention.
FIG. 3 is a partially cut away rear perspective view of the television receiver and cabinet shown in FIGS. 1 and 2.

Referring now to the drawings, in which the same reference numerals are used throughout the several views to designate the same elements, there is shown a television receiver including a cabinet 10 for enclosing the receiver components. The cabinet 10 has a pair of openings in the front, with one of the openings permitting mounting of a picture tube 11 for viewing and the other opening accommodating the front control panel 12 of a slidably mounted electronic chassis 13, which is normally located within the cabinet 10. The front control panel 12 fills the opening adjacent the picture tube 11 to present a relatively conventional appearance to the television receiver, and, the controls in the control panel 12 are the conventional controls normally associated with a black and white or color television receiver for permitting operation of the same by a viewer.

The chassis 13, however, is slidably mounted within the cabinet 10 for withdrawal forward of the cabinet 10 to a servicing position as illustrated in FIG. 1 and is guided for movement from the operating position within the cabinet 10 to the servicing position shown in FIG. 1 by means of guide rails 15 mounted on the top and bottom of the chassis 13 (only the top guide rail 15 being shown in the drawing). The guide rails 15 are guided in guide channels 17, mounted on the top and bottom inside surfaces of the cabinet 10, as indicated most clearly in FIG. 3. With the chassis 13 withdrawn to the servicing position as shown in FIGS. 1 and 3, the chassis provides accessibility to the electronic components mounted therein from the front of the television receiver. After servicing has been completed, the chassis 13 then may be pushed back into the receiver, with the rearmost position of the chassis being controlled by a stop 19 which engages a corresponding stop (not shown) mounted in the top of the cabinet 10 to prevent pushing the chassis 13 too far into the receiver against the cabinet back 20. Suitable means for locking the chassis into position in the operating position also may be provided if desired.

Since the servicing of the chassis 13 may be effected from the front of the television cabinet, it is desirable to be able to provide such servicing without removal of the back 20 of the cabinet 10 for any servicing which does not otherwise require the removal of the back 20. In order to accomplish this, an opening 21 (best seen in FIG. 3) is provided in the back 20 of the cabinet adjacent an antenna terminal panel 23 which is attached to the rear of the movable chassis 13. The antenna terminal panel 23 includes antenna terminals 25 and 27 for connection to VHF and UHF antenna leads 29 and 30, respectively, these leads in turn are supplied with received signals from a VHF antenna 31 and a UHF antenna 33 as shown in FIG. 2.

In addition a powerline cord interlock is provided between the chassis 13 and a powerline cord 35, which may be connected to a suitable source of operating current for the television receiver, such as ordinary household 110 volt, 60 hertz AC current. The powerline cord 35 terminates in a powerline cord terminal 37 attached to the back 20 of the cabinet 10. The terminal 37 includes female connectors which are aligned with corresponding male connector terminals 39 mounted on the back or rear surface of the chassis 13; so that with the chassis 13 pushed into the cabinet 10 in the operating position, the connector terminals 39 engage the line cord terminal 37 to provide an electrical power connection from the line cord 35 to the electronic components mounted within the chassis 13.

With the chassis 13 in the operating position as shown in FIG. 2, the terminal panel 23 substantially closes the opening 21 since the rear of the chassis 13 at the terminal panel 23 abuts the inner surface of the back 20 of the cabinet 10. Thus, no access to the terminals 39 is possible through the opening 21 with the chassis 13 in the normal operating position. Thus no dangerous high-voltage points are accessible from outside the cabinet 10.

When the chassis 13 is withdrawn to its forward or servicing position, as indicated in FIGS. 1 and 3, the connector terminals 39 are disengaged from the powerline cord terminal 37, as indicated in FIG. 3, thereby breaking the power supply to the chassis 13 and preventing its operation through the powerline cord 35. This is a necessary safety precaution which is required in all television receivers.

For facilitating the servicing of the chassis 13, however, without necessitating the removal of the back 20 of the cabinet the opening 21 is made sufficiently large to permit passage of a powerline cheater cord 40 through the opening 21 for connection to the terminals 39 on the rear of the chassis 13. The cheater cord 40 terminates in a female terminal 41 which is similar in configuration to the terminal 37, so that power may be applied to the chassis 13 through the connection of the terminal 41 with the terminals 39 by connecting the other end (not shown) of the cheater cord 40 to a suitable power supply. The antenna leads 29 and 30 are sufficiently long to permit their withdrawal into the cabinet 10 when the chassis 13 is withdrawn into its forward or servicing position.

After servicing has been completed, the cheater cord terminal 41 may be disconnected from the connector terminals 39; and the cheater cord 40 is withdrawn through the opening 21. Then when the chassis 13 is pushed back into the cabinet 10, the terminals 39 once again engage the powerline cord terminal 37, causing the receiver powerline cord 35 to be effective to supply power to the television receiver. In the closed or operating position of the chassis 13, the opening 21 is blocked by the antenna terminal panel 23, thereby satisfying the necessary safety requirements for the receiver.

It should be noted that it is desirable that the opening 21 is large enough to permit the passage of the hand of a serviceman therethrough for effecting the connection between the cheater cord terminal 41 and the connector terminals 39. If for some reason an opening this large were not desired, however, the opening 21 could be provided of a sufficient size to permit the insertion of a tool through the opening to effect the cheater cord connection. However, it has been found most satisfactory to make the opening 21 large enough to accommodate a human hand.

The opening 21 in the back 20 of the cabinet 10 permits servicing of the chassis 13 without removal of the back 20 from the cabinet of the receiver, thereby eliminating the unnecessary labor which otherwise would be required in the removal and replacement of the back 20 of the cabinet.

I claim:

1. In electronic apparatus including a cabinet having a front and back for enclosing an electronic chassis, with the chassis being slidably movable through an opening in the front of the cabinet from an operating position within the cabinet to a servicing position extending from the cabinet, and a powerline interlock for interconnecting a powerline cord terminal with the chassis in the operating position and disconnecting the chassis from the powerline cord terminal with the chassis in the servicing position, an improvement including in combination:

powerline connector terminal means mounted on the rear of the movable chassis for connection to a powerline for supplying power to the chassis;

powerline cord terminal means attached to the back of the cabinet for matingly conductively engaging the powerline connector terminal means on the rear of the chassis with the chassis in an operating position substantially abutting the cabinet back; and the cabinet back having an opening adjacent the powerline cord terminal means with said opening being closed by the rear of the chassis in said operating position, movement of the chassis to said servicing position disconnecting the connector terminal means from the powerline cord terminal means and unblocking the opening to permit attachment of a separate powerline cord to the line connector terminal means through the opening in the cabinet back without removing the cabinet back from the cabinet.

2. The combination according to claim 1 wherein the opening in the cabinet back is sufficient to permit the passage of a servicing powerline cord through the openings for connection to the powerline connector terminal means on the rear of the movable chassis with the movable chassis in the servicing position.

3. In a television receiver having a cabinet for enclosing a picture tube and an electronic chassis located alongside the picture tube, the cabinet having a back and having a front with a first opening for the picture tube and a second opening for a control panel mounted on the chassis, the chassis being slidably movable through the second opening in the front of the cabinet from an operating position within the cabinet to a servicing position extending from the front of the cabinet, an improvement including in combination:

antenna terminal means mounted on the rear of the movable chassis and adapted for attachment to television antenna leads;

powerline connector terminal means spaced from the antenna terminal means and mounted on the rear of the movable chassis for connection to a powerline for supplying power to the chassis;

powerline cord terminal means attached to the back of the cabinet for matingly conductively engaging the powerline connector terminal means on the rear of the chassis with the chassis in said operating position substantially abutting the cabinet back; and the cabinet back having an opening opposite the antenna terminal means on the chassis, the opening being blocked by the rear of the movable chassis in the operating position while permitting access to the antenna terminal means, movement of the chassis to the servicing position disconnecting the powerline connector terminal means from the powerline cord terminal means, thereby unlocking the opening in the cabinet back and providing access to the powerline connector terminal means through the unblocked opening.

4. The combination according to claim 3 wherein the opening in the cabinet back has dimensions sufficient to permit the passage of the hand of a serviceman therethrough with the chassis in the servicing position to enable connection of a powerline cord to the powerline connector terminal means without necessitating removal of the back from the television receiver cabinet.

5. The combination according to claim 4 further including antenna leads connected with the antenna terminal means, with the length of the antenna leads being sufficient to permit movement of the chassis from the operating position to the servicing position drawing the antenna leads through the opening in the cabinet back.

* * * * *